United States Patent [19]

Falconer

[11] 4,213,095
[45] Jul. 15, 1980

[54] FEEDFORWARD NONLINEAR EQUALIZATION OF MODULATED DATA SIGNALS

[75] Inventor: David D. Falconer, Red Bank, N.J.

[73] Assignee: Bell Telephone Laboratories, Incorporated, Murray Hill, N.J.

[21] Appl. No.: 931,026

[22] Filed: Aug. 4, 1978

[51] Int. Cl.² .............................................. H03H 7/40
[52] U.S. Cl. ....................................... 375/14; 333/18
[58] Field of Search ..................... 325/41, 42, 65, 320, 325/321, 323, 473; 328/155, 162; 333/17, 18; 340/347 DD

[56] References Cited

U.S. PATENT DOCUMENTS

| | | | |
|---|---|---|---|
| 3,231,819 | 1/1966 | Aaron | 325/65 |
| 3,434,056 | 3/1969 | Becker | 325/65 |
| 3,600,681 | 8/1978 | Arbuckle | 325/42 |
| 3,783,386 | 1/1974 | Sato | 325/321 |
| 3,787,762 | 1/1974 | Sato | 325/42 |
| 3,868,603 | 2/1975 | Guidoux | 333/18 |
| 3,878,468 | 4/1975 | Falconer | 325/320 |
| 3,879,664 | 4/1975 | Monsen | 325/303 |
| 3,906,347 | 9/1975 | Motley et al. | 325/42 |
| 3,974,449 | 8/1976 | Fallonett | 325/321 |

OTHER PUBLICATIONS

Theory of Mean Square Error QAM System Employing Decision Feedback Equalization, Falconer et al., Bell Syst. T.J., vol. 52, No. 10, Dec. 73, pp. 1821–1849.
Binary Signalling Over Channels Containing Quadratic Nonlinearities, Trans. IEEE Com-22, No. 3, pp. 288–298, Lawless et al.

Primary Examiner—Benedict V. Safourek
Attorney, Agent, or Firm—Ronald D. Slusky

[57] ABSTRACT

A feedforward nonlinear signal ($P(n)$) is added to each sample of a linearly equalized received signal ($Q(n)$) to provide compensation for nonlinear intersymbol interference. The received signal is a modulated data signal impaired by linear and nonlinear distortion as well as phase jitter and additive noise. The feedforward nonlinear signal added to each sample is comprised of a weighted sum of products of individual ones of the samples and their complex conjugates. Each multiplicand bears a predetermined temporal relationship to the sample currently being processed. In an illustrative embodiment, compensation for second- and third-order intersymbol interference is provided by including two- and three-multiplicand weighted products in the feedforward nonlinear signal. Weighting coefficients for each product are adaptively updated in a decision-directed manner.

25 Claims, 3 Drawing Figures

FEEDFORWARD NONLINEAR EQUALIZATION OF MODULATED DATA SIGNALS

CROSS-REFERENCE TO RELATED APPLICATION

My U.S. patent application entitled "Feedback Nonlinear Equalization of Modulated Data Signals," Ser. No. 931,025, was filed in the U.S. Patent and Trademark Office concurrently herewith.

BACKGROUND OF THE INVENTION

My invention relates to the correction of the distorting effects of limited bandwidth transmission media on modulated data signals.

The principal impediment to accurate reception of high-speed data signals transmitted over limited bandwidth, e.g., switched voiceband telephone, transmission channels is that form of distortion known as intersymbol interference. This phenomenon is a manifestation of the fact that a pulse passing through a band-limited channel expands in the time domain. As a result, each sample of the received signal is not simply derived from a single transmitted data symbol but, rather, some combination of symbols. Other impairments include phase jitter and additive noise.

Linear intersymbol interference, in particular, is manifested in that each sample of the received signal contains a linear combination of a transmitted symbol which the sample nominally represents with symbols which precede and succeed it in the data stream. Among known techniques which compensate for the distorting effects of linear intersymbol interference in both baseband and passband, e.g., quadrature amplitude modulated (QAM), signals are linear feedforward equalization and linear decision feedback equlization. In accordance with the former technique, each sample of the received signal is weighted with a linear sum of past and future samples prior to a decision being made as to the value of the transmitted symbol. In accordance with the latter technique, a weighted linear sum of past decisions is added to each sample, again prior to a decision being made as to the value of the transmitted symbol. See, for example, my U.S. Pat. No. 3,974,449 issued Aug. 10, 1976.

Nonlinear intersymbol interference is manifested in that each sample of the received signal represents a linear combination of products of the current, past and future modulated data symbols, and/or the complex conjugates of such data symbols. In transmission systems that employ linear modulation, such as QAM, the effect is to reduce the margin against noise. Indeed, for data rates above 4800 bps, nonlinear distortion is the dominant impairment on many voiceband channels. At least one arrangement is known which compensates for nonlinear intersymbol interference in baseband data signals. See, e.g., U.S. Pat. No. 3,600,681 issued Aug. 17, 1971 to T. Arbuckle. However, the known arrangements will not, in general, effectively compensate for nonlinear intersymbol interference in modulated data signals.

SUMMARY OF THE INVENTION

An object of my invention is to provide a method and arrangement which compensates for nonlinear intersymbol interference in modulated data signals.

A more particular object of my invention is to provide a method and arrangement which compensates for nonlinear intersymbol interference in modulated data signals in which both the carrier phase and amplitude are modulated, i.e., information-bearing.

A more particular object of my invention is to provide a method and arrangement which compensates for nonlinear intersymbol interference in quadrature amplitude modulated data signals.

In accordance with the invention, the above and other objects are achieved by generating and equalized feedforward nonlinear signal associated with each sample of the received signal. The feedforward nonlinear signal may be, for example, added to a linearly equalized version of the associated sample—the so-called feedforward linear signal—prior to demodulation.

In accordance with the invention, the feedforward nonlinear signal is comprised of a weighted sum of products of individual ones of the received samples and the complex conjugates of received samples. Each multiplicand, i.e., sample or complex conjugate, making up each product bears predetermined temporal relationship to the associated sample. Each product has a predetermined number of multiplicands and, in general, inclusion in the feedforward nonlinear signal of m-multiplicand products provides compensation for $m^{th}$ order intersymbol interference. the coefficients used in weighting the various products may be updated in an adaptive, decision-directed manner.

DETAILED DESCRIPTION

Figure 1:
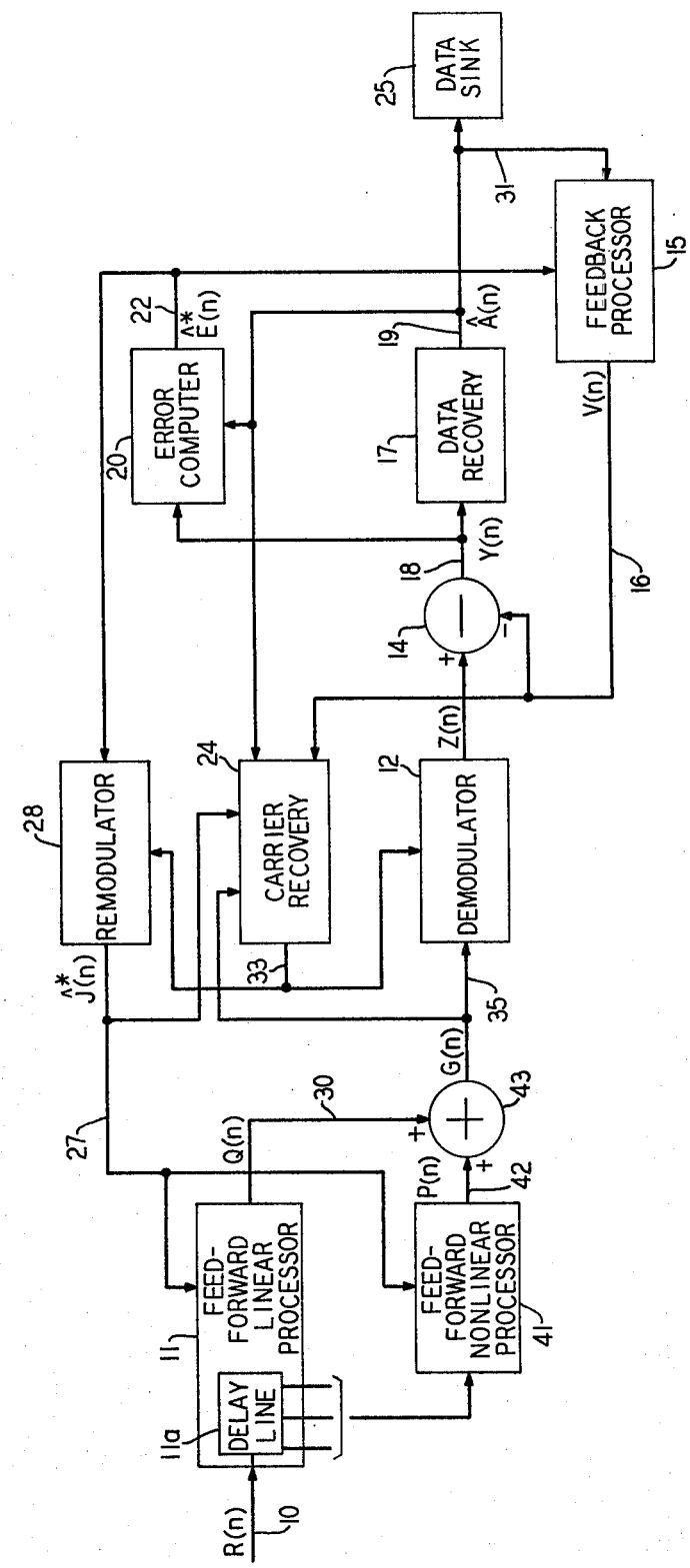
FIG. 1 is a block diagram of a receiver for modulated data signals including equalization circuitry which generates a nonlinear feedforward signal in accordance with the invention.

The receiver of FIG. 1 is illustratively employed in a high-speed telephone-voiceband data transmission system using quadrature amplitude modulation (QAM). The sampling interval is T seconds, the signaling rate being 1/T symbols per second. QAM entails both phase and amplitude modulation of a carrier, i.e., both the carrier phase and amplitude are information-bearing. As a result, QAM signals are referred to as "complex" signals and can be represented for notational convenience as complex numbers. This notational convention is followed herein so that all of the signal reference letters used in the following description should be understood to represent complex numbers.

The receiver FIG. 1 is of the same general type as that disclosed in my U.S. Pat. No. 3,974,449 issued Aug. 10, 1976, which is hereby incorporated by reference. Thus, as in my earlier patent, a sample R(n) of a received QAM data signal is provided on input lead 10, the index n indicated that R(n) is the sample of the QAM signal at time nT. Sample R(n) is applied to a feedforward linear processor 11. After some delay, the latter generates a linearly equalized version of sample R(n), feedforward linear signal Q(n), on lead 30, thereby providing at least some compensation for linear intersymbol interference in sample R(n), as well as for some of the additive noise present therein. As is conventional, processor 11 includes a delay line 11a to facilitate the linear feedforward equalization process.

In accordance with the invention, a feedforward nonlinear signal P(n), provided on lead 42 by a feedforward nonlinear processor 41, is added to signal Q(n) in an adder 43. As described in detail below, signal P(n) is comprised of a weighted combination of products of samples on lead 10 and the complex conjugates of received samples. Its summation with signal Q(n) provides compensation for nonlinear intersymbol interferences (as well as noise) in sample R(n).

The output signal G(n) of adder 43 is extended to a demodulator 12 over lead 35. Demodulator 12 produces a demodulated baseband data signal Z(n) which is applied to one input of a subtractor 14.

The receiver of FIG. 1 further includes data recovery circuit, or quantizer, 17. This unit quantizes the complex output signal Y(n) of subtractor 14, forming a decision Â(n) as to the value of the original modulating data symbol represented by, and to be recovered from, sample R(n). (Quantization of complex signals amounts to partitioning the complex plane into decision regions surrounding the ideal received points.) Decision Â(n) passes on to data sink 25. Decision Â(n) is also applied to feedback processor 15 over lead 31. The output V(n) of feedback processor 15 on lead 16 is subtracted from signal Z(n) is subtractor 14 to form the abovementioned signal Y(n).

Signal V(n) represents a weighed combination of past decisions made in data recovery circuit 17. The subtraction of signal V(n) from signal Z(n) in subtractor 14 removes at least a portion of the intersymbol interference and noise not compensated for upstream by feedforward processors 11 and 41. To this end, feedback processor 15 may include a feedback linear processor of conventional design for generating as part of signal V(n) a linear combination of past decisions such as Â(n−1) and Â(n=2). Feedback processor 15 may also include a feedback nonlinear processor of the type disclosed in my above-referenced U.S. patent application for generating as part of signal V(n) combinations of products of decisions and complex conjugates of decisions formed in data recovery circuit 17.

So-called weighting, or tap, coefficients for forming the aforementioned combinations of (a) the received signal samples in feedforward linear processor 11, (b) products of signal samples and complex conjugates thereof in feedforward nonlinear processor 41, and (c) products of data decisions and complex conjugates thereof in feedback processor 15 are automatically adjusted in an adaptive, decision-directed manner. This automatic adjustment of tap coefficients is implemented by circuitry including error computer 20. This unit provides on lead 22 the complex conjugate, Ê*(n), of an estimated error signal Ê(n), the latter representing the difference between signal Y(n) and decision Â(n). The tap coefficients used in processor 15 are adjusted in response to signal Ê*(n) in such a way as to minimize the average squared magnitude of that signal. The tap coefficients used in processors 11 and 41 are adjusted in response to the complex conjugate of a modulated version of the estimated error signal, again in such a way as to minimize the average squared magnitude of that signal. The complex conjugate of the modulated version of signal Ê(n) is provided by remodulator 28 on lead 27 as signal Ĵ*(n).

Phase jitter and frequency offset in modulated data sample R(n) can hinder accurate data recovery. In order to compensate for these impairments, demodulator 12 and remodulator 28 perform their functions using complex exponential signals of the form $e^{-j[2\pi f_c nT + \hat{\theta}(n)]}$, which are generated by carrier recovery circuit 24. The phase angle $\hat{\theta}(n)$ is an estimate of the carrier phase $\theta(n)$ of sample R(n). The estimated phase $\hat{\theta}(n+1)$ during the $(n+1)^{st}$ sampling period is updated in accordance with $$\hat{\theta}(n+1) = \hat{\theta}(n) - \alpha(n) \, \text{Im}[\hat{J}^*(n)G(n)]. \tag{1}$$

Carrier recovery circuit 24 receives signals $\hat{J}^*(n)$ and G(n) for purposes of computing $\hat{\theta}(n+1)$ in accordance with Eq. 1.

The factor $\alpha(n)$ may simply be a constant stored within the carrier recovery circuit. Alternatively, factor $\alpha(n)$ may be a function of current signal values so that updating of $\hat{\theta}(n)$ is carried out in response only to the phase angle error $[\theta(n) - \hat{\theta}(n)]$ and not in response to errors due to imperfect equalization and random amplitude modulation by data symbols in processors 11, 15 and 41. In deriving an expression for such an $\alpha(n)$, perfect equalization is postulated by assuming that the only discrepancy between Y(n) and Â(n) is in the phase error, $[\theta(n) - \hat{\theta}(n)]$. Therefore, $$Z(n) \approx [\hat{A}(n) + V(n)] \, e^{j[\theta(n) - \hat{\theta}(n)]}. \tag{2}$$

Moreover, $E(n) = Z(n) - V(n) - \hat{A}(n)$ and it can be shown that $J^*(n)G(n)$ is mathematically equivalent to $E^*(n)Z(n)$. Therefore, Eq. (2) can be substituted into Eq. (1) to yield $$\hat{\theta}(n+1) = \hat{\theta}(n) - \alpha(n)|\hat{A}(n) + V(n)|^2 \sin(\hat{\theta}(n) - \theta(n)).$$

Therefore, a suitable choice for $\alpha(n)$ is seen to be $$\alpha(n) = \frac{\alpha}{|\hat{A}(n) + V(n)|^2}, \tag{3}$$

where $\alpha$ is a small constant, because then $$\hat{\theta}(n+1) = \hat{\theta}(n) - \alpha \sin(\hat{\theta}(n) - \theta(n)).$$

Thus, as desired, the updating of $\hat{\theta}(n)$ is based only on the phase error, providing a smoother, more direct acquisition of carrier phase. Carrier recovery circuit 24 illustratively receives decision Â(n) and signal V(n) for purposes of generating $\alpha(n)$ in accordance with Eq. (3).

With the exception of processor 41, and the feedback nonlinear circuitry in processor 15, if any, the specific circuitry comprising the various components of the receiver of FIG. 1, as well as their functional and timing interrelationships, are all well known in the art and need not be discussed in further detail. See, for example, my above-cited U.S. Patent for a description of the receiver generally and my above-referenced copending U.S. application for a description of the feedback nonlinear circuitry. The remainder of this detailed description, then, is principally directed to (a) characterization of feed-forward nonlinear signal P(n) and (b) description of illustrative circuitry, shown in FIGS. 2 and 3, for generating signal P(n).

Feedforward nonlinear signal P(n) is comprised of a weighted sum of products of individual ones of the samples received on lead 10 and the complex conjugates of received samples. Each multiplicand, i.e., sample or complex conjugate, making up each product bears a predetermined temporal relationship to sample R(n). Each product has a predetermined number of multiplicands and, in general, inclusion in the feedforward nonlinear signal of m-multiplicand products provides compensation for the $m^{th}$ order intersymbol interference.

Processor 41 illustratively provides compensation for second- and third-order nonlinear intersymbol interference. Thus, composite feedforward signal G(n) can be expressed as follows:

$$G(n) = [Q(n) + P(n)] \quad (4)$$

where $$Q(n) = \sum_i W_i^{(0)*}(n) R(n-i)$$

and $P(n) =$ $$\sum_{(j_1,j_2)} W^{(1)*}_{j_1,j_2}(n) R(n-j_1) R(n-j_2) \equiv P_1(n)$$

$$+ \sum_{(j_3,j_4)} W^{(2)*}_{j_3,j_4}(n) R(n-j_3) R(n-j_4)^* \equiv P_2(n)$$

$$+ \sum_{(k_1,k_2,k_3)} W^{(3)*}_{k_1,k_2,k_3}(n) R(n-k_1) R(n-k_2) R(n-k_3) \equiv P_3(n)$$

$$+ \sum_{(k_4,k_5,k_6)} W^{(4)*}_{k_4,k_5,k_6}(n) R(n-k_4) R(n-k_5) R(n-k_6)^* \equiv P_4(n)$$

$$+ \sum_{(k_7,k_8,k_9)} W^{(5)*}_{k_7,k_8,k_9}(n) R(n-k_7)^* R(n-k_8)^* R(n-k_9) \equiv P_5(n)$$

Q(n), the prior art feedforward linear signal, is comprised of a linear combination of received samples R(n−i), each sample being weighted by the complex conjugate of complex weighting, or tap, coefficient $W_i^{(0)}(n)$, i.e., $W_i^{(0)*}(n)$. The index i typically spans a range of positive and negative values so that Q(n) includes a sufficient number of samples which both precede and succeed sample R(n) in the data stream to yield effective equalization. As is conventional, the values of coefficients $W_i^{(0)}(n)$ are adjusted adaptively in a decision-directed manner in processor 11 using a gradient adaptation algorithm, yielding the updating relationship $$W_i^{(0)}(n+1) = W_i^{(0)}(n) - \beta_0(n) R(n-i) \hat{J}^*(n),$$

in which $\beta_0(n)$ is a selected scaling factor which may be updated each sampling period or which may more simply be an empirically-determined constant.

The first two terms of feedforward nonlinear signal P(n), defined for convenience as $P_1(n)$ and $P_2(n)$, provide compensation for second-order intersymbol interference. (In a given application, it may be desired to include only one of these terms in signal P(n).) Each of the terms $P_1(n)$ and $P_2(n)$ is comprised of a weighted sum of two-multiplicand products, with each multiplicand of each product being derived from a selected sample. That is, each multiplicand is either a sample or the complex conjugate of a sample.

In particular, the two multiplicands of each product of term $P_1(n)$ are a selected two samples $R(n-j_1)$ and $R(n-j_2)$ weighted by the complex conjugate of an associated weighting coefficient $W^{(1)}_{j_1,j_2}(n)$, i.e., $W^{(1)*}_{j_1,j_2}(n)$.

Index pairs $(j_1,j_2)$ are predetermined and are selected keeping in mind that the most significant nonlinear (and, indeed, linear) intersymbol interference in a sample representing a given symbol is most usually due to symbols which are relatively close to it in the data stream. Moreover, increasing the number of index pairs to encompass samples which are more remote in time will have increasingly less effect in removing intersymbol interference, on the one hand, while possibly requiring increased hardware costs and/or processing time on the other hand. In the present embodiment, the following $(j_1,j_2)$ index pairs are illustratively used: (−1,−1) (−1,0) (−1,1) (0,0) (0,1) (1,1). Term $P_1(n)$ is thus given by $$W^{(1)*}_{-1,-1}(n) R(n+1)^2 + W^{(1)*}_{-1,0}(n) R(n+1) R(n) + W^{(1)*}_{-1,1}(n) R(n+1)R(n-1) \quad (5a)$$

$$+ W^{(1)*}_{0,0}(n) R(n)^2 + W^{(1)*}_{0,1}(n) R(n)R(n-1) + W^{(1)*}_{1,1}(n) R(n-1)^2 \quad (5b)$$

This term, then, encompasses a weighted sum of all possible two-multiplicand signal products in which each multiplicand is either the sample R(n), the sample which immediately precedes it in the data stream, R(n−1), or the one which immediately succeeds it, R(n+1).

The second term of signal P(n), $P_2(n)$, is similar to $P_1(n)$ except that the second multiplicand of each product is a complex conjugate. An illustrative set of index pairs $(j_3,j_4)$ for this second term is (−1,−1) (−1,0)(−1,1)(0,−1)(0,0)(0,1)(1,−1)(1,0)(1,1). Note that reversing the order of the $(j_3,j_4)$ index pairs, e.g., (−1,0) and (0,−1), provides different products in term $P_2(n)$, although not in term $P_1(n)$. Thus, even though all of the indices $j_3$ and $j_4$ are each either −1,0 or 1, just as in the case of indices $j_1$ and $j_2$, here there are nine possible different sample products, rather than six as in the case of term $P_1(n)$.

The final three terms of signal P(n), $P_3(n)$, $P_4(n)$ and $P_5(n)$, provide compensation for third-order intersymbol interference. (Again, in a given application, it may be desired to use less than all of these terms.) In particular, term $P_3(n)$ is comprised of a weighted sum of three-multiplicand products each having an associated weighting coefficient. Terms $P_4(n)$ and $P_5(n)$ are similar to term $P_3(n)$ but include one and two complex conjugates of samples, respectively. Index triples $(k_1,k_2,k_3)$ for term $P_3(n)$ illustratively take on the values (−1,−1,−1)(−1,−1,0)(−1,0,1)(0,0,−1)(0,0,0)(0,0,1) (1,1,0) and (1,1,1). Index triples for terms $P_4(n)$ and $P_5(n)$ illustratively take on the values (−1,−1,−1) (−1,−1,0)(−1,0,−1)(−1,0,1)(−1,1,0)(0,−1,0)(0,0,−1) (0,0,0)(0,0,1)(0.1,−1)(0,1,0)(1,0,1)(1,1,0) and (1,1,1) in each case. Note that for index triples $(k_1,k_2,k_3)$, $(k_4,k_5,k_6)$ and $(k_7,k_8,k_9)$ less than all possible combinations yielding unique three-multiplicand products are used. This is done simply to minimize the amount of signal processing needed to generate signal P(n). In general, using all possible combinations yielding unique three-multiplicand products in generating terms $P_3(n)$, $P_4(n)$ and $P_5(n)$ will provide additional reduction of third-order intersymbol interference.

Compensation for fourth- or higher-order intersymbol interference may be provided in accordance with the invention by obvious extension of the second- and third-order cases.

As previously indicated, the values of the weighting coefficients used in feedforward nonlinear processor 41, like those used in feedforward linear processor 11, are adjusted adaptively in a decision-directed manner. As in the case of processor 11, a gradient adaptation criterion is illustratively used. By way of example, this criterion is expressed for the coefficients $W_{j_1,j_2}^{(1)}(n)$ as:

$$W_{j_1,j_2}^{(1)}(n+1) = W_{j_1,j_2}^{(1)}(n) - \frac{1}{2}\left[\beta_1(n)\frac{\alpha|\hat{E}(n)|^2}{\delta W_{j_1,j_2}^{(1)}(n)}\right]$$

where, $$\frac{\delta|\hat{E}(n)|^2}{\delta W_{j_1,j_2}^{(1)}(n)} = \frac{\delta|\hat{E}(n)|^2}{\delta Re\left(W_{j_1,j_2}^{(1)}(n)\right)} + j\frac{\delta|\hat{E}(n)|^2}{\delta Im\left(W_{j_1,j_2}^{(1)}(n)\right)}$$
$$= 2R(n-j_1)R(n-j_2)\hat{E}(n)e^{-j[2\pi f_c nT + \hat{\theta}(n)]}$$
$$= 2R(n-j_1)R(n-j_2)\hat{J}^*(n).$$

Thus, $$W_{j_1,j_2}^{(1)}(n+1) = W_{j_1,j_2}^{(1)}(n) - \beta_1(n)R(n-j_1)R(n-j_2)\hat{J}^*(n). \quad (6)$$

The other four sets of weighting coefficients used in generating term P(n) are generated similarly to coefficients $W_{j_1,j_2}^{(1)}(n)$. That is $$W_{j_3,j_4}^{(2)}(n+1) = W_{j_3,j_4}^{(2)}(n) - \beta_2(n)R(n-j_3)R(n-j_4)\hat{J}^*(n),$$

$$W_{k_1,k_2,k_3}^{(3)}(n+1) = W_{k_1,k_2,k_3}^{(3)}(n) - \beta_3(n)R(n-k_1)R(n-k_2)R(n-k_3)\hat{J}^*(n),$$

$$W_{k_4,k_5,k_6}^{(4)}(n+1) = W_{k_1,k_2,k_3}^{(4)}(n) - \beta_4(n)R(n-k_4)R(n-k_5)R(n-k_6)^*\hat{J}^*(n),$$

and $$W_{k_7,k_8,k_9}^{(5)}(n+1) = W_{k_7,k_8,k_9}^{(5)}(n) - \beta_5(n)R(n-k_7)^*R(n-k_8)^*R(n-k_9)\hat{J}^*(n),$$

Although, in general, multiplicative scaling factors $\beta_1(n)-\Gamma_5(n)$ can be updated at each sampling time, they, like $\beta_0(n)$, can more simply be fractional constants, the values of which are empirically determined. As seen in FIG. 1, feedforward nonlinear processor 41, like feedforward linear processor 11, receives signal $\hat{J}^*(n)$ for purposes of coefficient updating.

Figure 2:
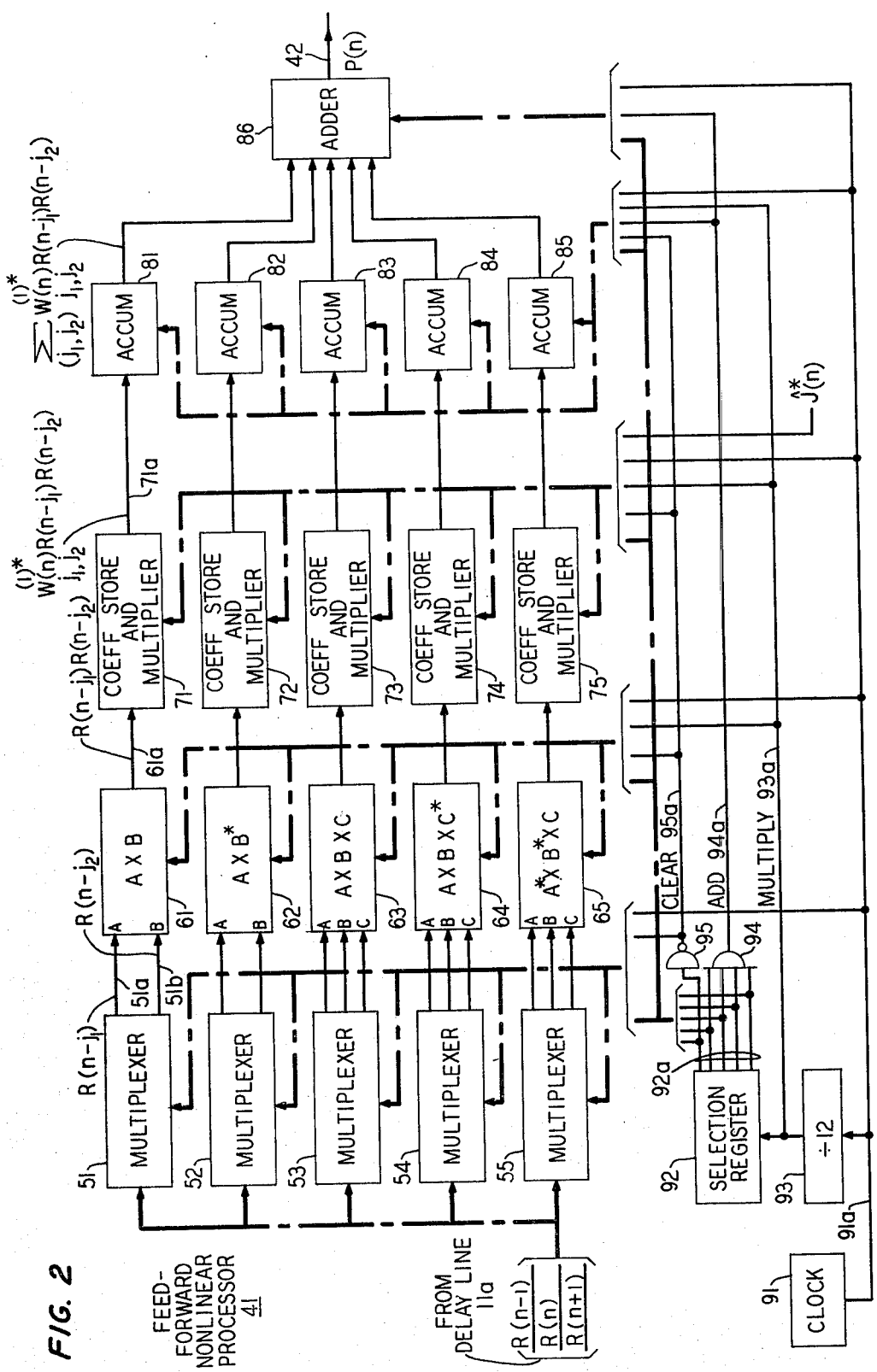
FIG. 2 is a block diagram of an illustrative signal processor for generating the nonlinear feedforward signal.

Attention is now directed to FIG. 2, which shows an illustrative embodiment of feedforward nonlinear processor 41. Processor 41 includes multiplexers 51-55, complex multipliers 61-65, coefficient store and multiplier (CSM) units 71-75 and accumulators 81-85. During each sampling period, the serially connected chain of multiplexer 51, multiplier 61 and CSM unit 71 generates and stores term $P_1(n)$ of signal P(n) in accumulator 81. Terms $P_2(n)-P_5(n)$ are generated and stored similarly, each by its own multiplexer-multiplier-CSM unit-accumulator chain. Since the chains which begin with multiplexers 51 and 52 generate terms of signal P(n) which have two-multiplicand products, i.e., terms $P_1(n)$ and $P_2(n)$, those multiplexers each extend two output leads to two-input complex multipliers 61 and 62, respectively. Multiplexers 53-55 each extend three output leads to multipliers 63-65, respectively, in order to generate the three-sample products which make up terms $P_3(n)-P_5(n)$.

After terms $P_1(n)-P_5(n)$ have all been stored in their respective accumulators, they are added together in adder 86 to generate feeforward nonlinear signal P(n) on lead 42.

Processor 41 operates under the control of a clock 91. The latter, in turn, operates at a frequency sufficient to ensure that the generation of signal P(n) is completed during a single sampling interval, T. As described in further detail below, the clock pulses on output lead 91a of clock 91 control the shifting through processor 41 of serial bit streams representing samples, complex conjugates of samples and intermediate products of these. The clock pulses on lead 91a are, in addition, received by a divide-by-twelve counter 93. The output pulses from counter 93 on lead 93a initiate multiplication operations in multipliers 61-65 and CSM units 71-75.

Counter 93 also drives selection register 92-illustratively a divide-by-seventeen counter. Register 92 increments the five-bit number represented by the signals of five output leads 92a by one count in response to each pulse from counter 93 on lead 93a. During each sampling period, three samples-R(n−1), R(n) and R(n+1)-are received by multiplexers 51-55 from delay line 11a of feedforward linear processor 11, the two feedforward processors advantageously sharing this delay line between them. Each of the three samples is illustratively represented by twelve serial bits which are stored internally by each multiplexer in response to the first twelve clock pulses on lead 91a. The count on lead 92a at any given time indicates to each of the multiplexers which of the three samples is to be provided on each of the multiplexer output leads in response to each group of twelve clock pulses.

By way of illustration, operation of the chain which begins with multiplexer 51 in generating term $P_1(n)$ will now be described, the operation of the other chains being similar. For purposes of explanation, it is assumed that the first sixty clock pulses with the $n^{th}$ sampling period have elapsed. Thus, at this point, the first three weighted products of term $P_1(n)$—shown in line (5a) above—have been summed and stored in accumulator 81. The fourth weighted product, $W_{0,0}^{(1)*}(n)R(n)^2$, has just been generated in CSM unit 71, while the fifth, unweighted product, $R(n)R(n-1)$ has just been generated in multiplier 61.

A number of operations occur concurrently in response to the next twelve clock pulses. The twelve bits of the weighted product $W_{0,0}^{(1)*}(n)R(n)^2$ are shifted via lead 71a from CSM unit 71 into accumulator 81, where it is added to the current contents of the accumulator. In addition, the unweighted, fifth product $R(n)R(n-1)$ is shifted via lead 61a from multiplier 61 to CSM unit 71. The binary count on leads 92a is now 00101. In response to that count and to the twelve clock pulses currently being generated, multiplexer 51 provides the sample $R(n-1)$ on both of its output leads 51a and 51b since the sixth (and last) value of index pair $(j_1,j_2)$ is (1,1). The subsequent pulse on lead 93a initiates the accumulation operation in accumulator 81. It also initiates the multiplication in CSM unit 71 of $R(n)R(n-1)$ with the complex conjugate of the current value of its associated weighting coefficient, $W_{0,1}^{(1)*}(n)$ stored in the CSM unit. The pulse on lead 93a also initiates the multiplication of sample $R(n-1)$ by itself in multiplier 61.

The count on leads 92a, in addition to the function described above, is also used to indicate to the various components of feedforward nonlinear processor 41 when and when not to respond to the clock pulses on lead 91a. For example, the fact that the last, i.e., sixth, two-sample product in term $P_1(n)$ has now been generated is manifested by the fact that the count on leads 92a is 00101. Simple logic circuitry within multiplexer 51 and multiplier 61 precludes them from responding to further clock pulses. CSM unit 71 begins and ceases operation twelve clock pulses after multiplexer 51 and multiplier 61 begin and cease their operation; for accumulator 81 the number is twenty-four clock pulses. Thus, similar logic circuitry in CSM units 71 and accumulator 81 allows them to respond to clock pulses only when the count on leads 92a is at or between 00001 and 00110, for the former, and 00010 and 00111 for the latter. The other components within each chain of processor 41 similarly have logic circuits for controlling which clock pulses they will respond to, depending on (a) how many products are to be computed in that chain and (b) the position of the particular component within its chain. A typical such logic circuit is shown in the illustrative embodiment of CSM unit 71 in FIG. 3 as described below.

When the count on leads 92a has reached 01111, terms $P_1(n) - P_5(n)$ have all been generated and stored in accumulators 81–85, respectively. AND gate 94 now generates a pulse on lead 94a which causes the contents of accumulators 81–85 to be added together in adder 86, the resultant signal on lead 42 being feedforward nonlinear signal P(n). When the count on leads 92a reaches its last value, 10000, the output of NOT gate 95 on lead 95a goes low, clearing multiplexers 51–55, multipliers 61–65, CSM units 71–75, and accumulators 81–85 in preparation for generating nonlinear feedforward signal $P(n+1)$ during the next, $(n+1)^{st}$, sampling period.

It will be appreciated that FIG. 2 represents but one of numerous possible approaches for realizing feedforward nonlinear processor 41. Thus, for example, the terms $P_1(n) - P_5(n)$ could be generated serially, one after the other, rather than in parallel. Such an approach would require less arithmetic hardware. However, the circuitry needed to manipulate the samples and their products would be more complicated. In addition, all of the arithmetic operations which have to be performed in generating signal P(n) would still have to be completed during a single sampling period, imposing more stringent requirements on the speed with which the various arithmetic operations would have to be performed. These requirements might be advantageously satisfied by generating signal P(n) using a microprocessor. In any event, it will be appreciated that the needs of the particular application will govern the structure of processor 41.

Figure 3:
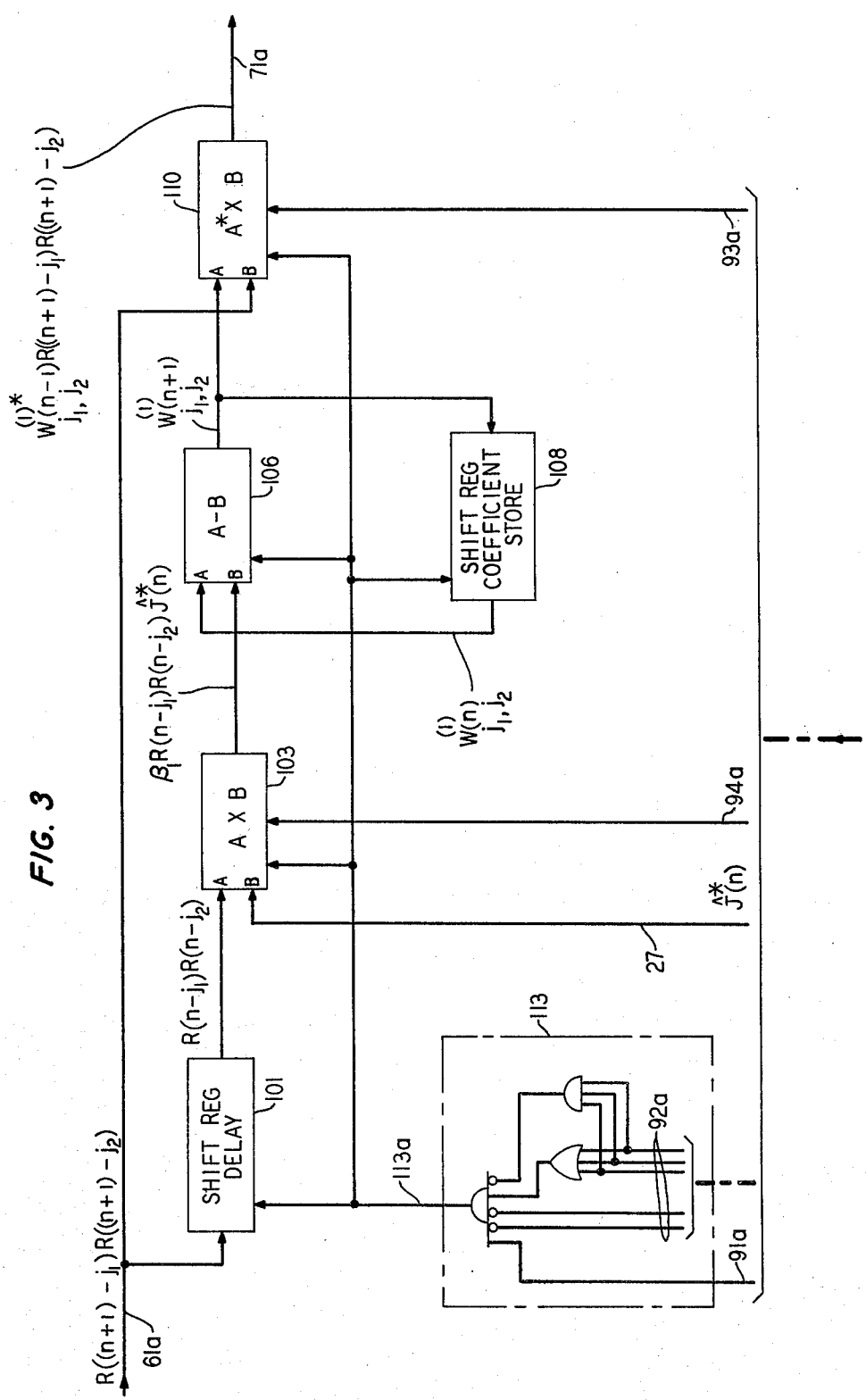
FIG. 3 is an illustrative coefficient store and multiplier unit for use in the processor of FIG. 2.

Each of the functional blocks depicted in FIG. 2 may be of conventional design and need not be described in further detail herein. However, a particularly advantageous realization for CSM unit 71 (CSM units 72–75 being similar) is shown in FIG. 3.

Each component of CSM unit 71 receives clock pulses via lead 113a. As previously indicated, CSM unit 71 is to operate only when the count on leads 92a is at or between 00001 and 00110. This mode of operation is achieved by logic circuit 113 which controls the flow of clock pulses onto lead 113a from lead 91a in response to the count on leads 92a.

It will be remembered from Eq. (6) that the updated value of each coefficient is given by its previous value minus a term which includes the complex conjugate of the remodulated estimated error signal $\hat{J}^*(n)$. The latter, however, is not known until signal P(n) has been generated. Thus, as shown in FIG. 3, the sample products $R(n-j_1)R(n-j_2)$ received by CSM unit 71 are delayed in a serial in/serial out shift register 101 for one sampling period. Thus, as the first sample product of term $P_1(n)$, $R(n+1)^2$, emerges from the shift register 101 at the beginning of the next, $(n+1)^{st}$, sampling period, signal $\hat{J}^*(n)$ is first becoming available on lead 27. Sample product $R(n+1)^2$ is multiplied in multiplier 103 by signal $\hat{J}^*(n)$ and by $\beta_1(n)$—illustratively a constant, $\beta_1$—to generate the correction term $\beta_1 R(n+1)^2 \hat{J}^*(n)$.

At this time, coefficient $W_{-1,-1}^{(1)}(n)$ is just beginning to appear at the output of coefficient store 108, illustratively another serial in/serial out shift register. The correction term at the output of multiplier 103 is subtracted from $W_{-1,-1}^{(1)}(n)$ in subtractor 106 to generate $W_{-1,-1}^{(1)}(n+1)$. Since at this time the first sample product of term $P_1(n+1) - R((n+1)+1)^2$—is being introduced on lead 61a, coefficient $W_{-1,-1}^{(1)}(n+1)$ is passed directly to multiplier 110, so that the latter is able to form the product $W_{-1,-1}^{(1)*}(n+1)R((n+1)+1)^2$, i.e., the first weighted product of term $P_1(n+1)$, on lead 71a. In addition, coefficient $W_{-1,-1}^{(1)}(n+1)$ is entered into coefficient store 108 from which it will emerge for updating at the beginning of the $(n+2)^{nd}$ sampling period to generate $W_{-1,-1}^{(1)}(n+2)$.

Similarly, as each subsequent sample product making up term $P_1(n+1)$ is introduced on lead 61a, the corresponding coefficient emerges from coefficient store 108, is updated, and is multiplied by that product in multiplier 110. At the end of the $(n+1)^{st}$ sampling period, the pulse on lead 95a clears signal $\hat{J}^*(n)$ in multiplier 103 in preparation for storage therein of signal $\hat{J}^*(n+1)$.

Although a specific embodiment of my invention has been shown and described, such merely illustrates the principles of my invention. For example, although the invention has been illustrated in conjunction with a QAM system, it is equally applicable to any modulation system in which both the carrier phase and amplitude are modulated, i.e., information-bearing.

Thus, it will be appreciated that numerous arrangements embodying the principles of the invention may be devised by those skilled in the art without departing from their spirit and scope.

I claim:

1. In an arrangement responsive to samples of a received modulated data signal for forming decisions as to the values of data symbols contained in said signal, each of said samples being represented by a complex number, that improvement which comprises means (51–55, 61–65) for forming a plurality of signal products associated with an individual one of said samples, each multiplicand of each product being derived from a respective one of said samples, each said respective one of said samples bearing a predetermined temporal relationship to said individual one of said samples, and at least one multiplicand of individual ones of said signal products being the complex conjugate of the sample from which said one multiplicand is derived, means (71–75) for multiplying each of said products by an associated coefficient to form a plurality of weighted products, means (81–86) for combining said weighted products with each other to generate a feedforward nonlinear signal, and means (12, 14, 17, 43) for forming an individual one of said decisions in response to said feedforward nonlinear signal.

2. The invention of claim 1 wherein said modulated data signal is of the type in which both the carrier phase and amplitude are information-bearing.

3. The invention of claim 1 wherein said modulated data signal is a quadrature amplitude modulated signal.

4. In an arrangement responsive to samples of a received modulated data signal for forming decisions as to thee values of data symbols contained in said signal, said signal being of the type in which both the carrier phase and amplitude are information bearing and each of said samples being represented by a complex number, that improvement which comprises means (51–55, 61–65) for forming a plurality of signal products associated with an individual one of said samples, each multiplicand of each product being derived from a respective one of said samples, each said respective one of said samples bearing a predetermined temporal relationship to said individual one of said samples, and at least one multiplicand of individual ones of said signal products being the complex conjugate of the sample from which said one multiplicand is derived, means (71–75 for multiplying each of said products by an associated coefficient to form a plurality of weighted products, means (11, 43) for multiplying predetermined ones of said samples by respective associateed coefficients and for summing the resulting products with said weighted products to form a composite feedforward signal and means (12, 14, 17) responsive to said composite feedforward signal for forming an individual one of said decisions.

5. In an arrangement responsive to complex samples of a received modulated data signal for forming decisions as to the values of data symbols represented by said signal, both the carrier phase and amplitude of said signal being information-bearing, that improvement which comprises means (51–55, 61–65) operative during each of a plurality of successive sampling periods for forming a plurality of signal products associated with an individual one of said samples, each multiplicand of each product being derived from a respective one of said samples, each said respective one of said samples bearing a predetermined temporal relationship to said individual one of said samples, and at least one multiplicand of individual ones of said signal products being the complex conjugate of the sample from which said one multiplicand is derived, means (71—75) operative during each of said sampling periods for multiplying said products by respective associated coefficients to form a plurality of weighted products, the value of each of said coefficients during an individual one of said sampling periods being its value during a preceding sampling period modified by a correction factor, means (81–86) for combining said weighted products with each other to generate a feedforward nonlinear signal, means (11, 43) responsive to predetermined ones of said samples for generating a feedforward linear signal and for combining it with said feedforward nonlinear signal to form a composite feedforward signal, and means (12, 14, 17) for forming an individual one of said decisions in response to said composite feedforward signal.

6. The invention of claim 5 further comprising means (12) for demodulating said composite feedforward signal, means (17) for generating a quantized data signal in response to the demodulated composite feedforward signal, means for forming an error signal (20) in response to said demodulated signal and said quantized data signal, and means (28) for modulating said error signal at the carrier frequency of said modulated data signal to form a modulated error signal, said correction factor for an individual one of said coefficients being a function of the product associated with said individual one of said coefficients during said preceding sampling period and of the modulated error signal for said preceding sampling period.

7. In a method for forming decisions as to the values of data symbols contained in a received modulated data signal, said decisions being formed in response to complex samples of said received signal, that improvement which comprises the steps of forming a plurality of signal products associated with an individual one of said samples, each multiplicand of each product being derived from a respective one of said samples, each said respective one of said samples bearing a predetermined temporal relationship to said individual one of said samples, and at least one multiplicand of individual ones of said signal products being the complex conjugate of the sample from which said one multiplicand is derived, multiplying each of said products by an associated coefficient to form a plurality of weighted products, combining said weighted products with each other to generate a feedforward nonlinear signal, and forming an individual one of said decisions in response to said feedforward nonlinear signal.

8. The invention of claim 7 wherein said modulated data signal is of the type in which both the carrier phase and amplitude are modulated.

9. The invention of claim 7 wherein said modulated data signal is a quadrature amplitude modulated signal.

10. In a method for forming decisions as to the values of data symbols contained in a received quadrature amplitude modulated data signal, said decisions being formed in response to complex samples of said received signal, that improvement which comprises the steps of forming a plurality of signal products associated with an individual one of said samples, each multiplicand of each product being derived from a respective one of said samples, each said respective one of said samples bearing a predetermined temporal relationship to said individual one of said samples, and at least one multiplicand of individual ones of said signal products being the complex conjugate of the sample from which said one multiplicand is derived, multiplying each of said products by an associated coefficient to form a plurality of weighted products, combining said weighted products with each other to generate a feedforward nonlinear signal, generating a feedforward linear signal in response to predetermined ones of said samples combining said feedforward linear signal with said feedforward nonlinear signal to form a composite feedforward signal, and forming an individual one of said decisions in response to said composite feedforward signal.

11. In a method for forming decisions as to the values of data symbols represented by a received modulated data signal in which both the carrier phase and amplitude are information-bearing, said decisions being formed in response to samples of said received signal each of which is represented by a complex number, that improvement which comprises the steps of forming during each of a plurality of successive sampling periods a plurality of signal products associated with an individual one of said samples, each multiplicand of each product being derived from a respective one of said samples, each said respective one of said samples bearing a predetermined temporal relationship to said individual one of said samples, and at least one multiplicand of individual ones of said signal products being the complex conjugate of the sample from which said one multiplicand is derived, multiplying said products by respective associated coefficients during each of said sampling periods to form a plurality of weighted products, the value of each of said coefficients during an individual one of said sampling periods being its value during the preceding sampling period modified by a correction factor, combining said weighted products with each other to generate a feedforward nonlinear signal, and forming an individual one of said decisions in response to a composite signal which includes said feedforward nonlinear signal.

12. The invention of claim 11 comprising the further steps of multiplying predetermined ones of said samples by respective associated coefficients and combining the resulting products with said feedforward nonlinear signal to form a composite feedforward signal, demodulating said composite feedforward signal, generating a quantized data signal in response to the demodulated composite feedforward signal, forming an error signal in response to said demodulated signal and said quantized data signal, and modulating said error signal at the carrier frequency of said modulated data signal to form a modulated error signal, said correction factor for an individual one of said coefficients being a function of the product associated with said individual one of said coefficients during said preceding sampling period and of the modulated error signal for said preceding sampling period.

13. In an arrangement for receiving a succession of complex samples of a modulated data signal of the type in which both the carrier amplitude and phase are information-bearing, the $n^{th}$ of said samples being $R(n)$, said signal representing a plurality of data symbols, the method which comprises the steps of generating an equalized feedforward nonlinear signal $P(n)$ corresponding to said sample $R(n)$, said signal $P(n)$ including the terms $$\sum_{j_1,j_2} W_{j_1,j_2}^{(1)*}(n) R(n-j_1)R(n-j_2) \text{ and}$$

$$\sum_{j_3,j_4} W_{j_3,j_4}^{(2)*}(n) R(n-j_3)R(n-j_4)^*,$$

\* indicating complex conjugate, the coefficients $W_{j_1,j_2}^{(1)*}(n)$ and $W_{j_3,j_4}^{(2)*}(n)$ having respective values associated with said sample $R(n)$, and the index pairs $(j_1,j_2)$ and $(j_3,j_4)$ having respective sets of predetermined values, and forming a decision $\hat{A}(n)$ as to the value of an individual one of said data symbols in response to said signal $P(n)$.

14. The invention of claim 13 wherein said decision-generating step is comprised of the steps of forming a demodulated signal $Y(n)$ in response to at least said signal $P(n)$ and quantizing said signal $Y(n)$ to generate said decision $\hat{A}(n)$, and wherein said method is comprised of the further steps of forming a modulated error signal $\hat{J}^*(n)$ in response to said signal $Y(n)$ and said decision $\hat{A}(n)$, and updating the coefficients $W_{j_1,j_2}^{(1)*}(n)$ and $W_{j_3,j_4}^{(2)*}(n)$ in accordance with $$W_{j_1,j_2}^{(1)}(n+1) = W_{j_1,j_2}^{(1)}(n) - \beta_1(n)R(n-j_1)R(n-j_2)\hat{J}^*(n),$$

and $$W_{j_3,j_4}^{(2)}(n+1) = W_{j_3,j_4}^{(2)}(n) - \beta_2(n)R(n-j_3)R(n-j_4)\hat{J}^*(n),$$

$\beta_1(n)$ and $\beta_2(n)$ being selected scaling factors.

15. The invention of claim 14 comprising the further steps of generating an equalized feedforward linear signal $Q(n)$, $$Q(n) = \sum_i W_i^{(0)*}(n) R(n-i),$$

the coefficients $W_i^{(0)*}(n)$ having respective values associated with said sample $R(n)$ and the index $i$ having a set of predetermined values, said signal $Y(n)$ being formed also in response to said signal $Q(n)$, and updating the coefficients $W_i^{(0)*}(n)$ in accordance with $$W_i^{(0)}(n+1) = W_i^{(0)}(n) - \beta_0(n)R(n-i)\hat{J}^*(n),$$

$\beta_0(n)$ being a selected scaling factor.

16. The invention of claim 13 wherein said signal $P(n)$ further includes at least a selected one of the terms $$\sum_{k_1,k_2,k_3} W_{k_1,k_2,k_3}^{(3)*}(n) R(n-k_1)R(n-k_2)R(n-k_3),$$

$$\sum_{k_4,k_5,k_6} W_{k_4,k_5,k_6}^{(4)*}(n) R(n-k_4)R(n-k_5)R(n-k_6)^*,$$

and $$\sum_{k_7,k_8,k_9} W_{k_7,k_8,k_9}^{(5)*}(n) R(n-k_7)^*R(n-k_8)^*R(n-k_9),$$

the coefficients $W_{k_1,k_2,k_3}^{(3)*}(n)$, $W_{k_4,k_5,k_6}^{(4)*}(n)$ and $W_{k_7,k_8,k_9}^{(5)*}(n)$ having respective values associated with said sample $R(n)$, and the index triples $(k_1,k_2,k_3)$, $(k_4,k_5,k_6)$ and $(k_7,k_8,k_9)$ having respective sets of predetermined values.

17. The invention of claim 16 wherein said decision-generating step is comprised of the steps of forming a demodulated signal $Y(n)$ in response to at least said signal $P(n)$ and quantizing said signal $Y(n)$ to generate said decision $\hat{A}(n)$, and wherein said method is comprised of the further steps of forming a modulated error signal $\hat{J}^*(n)$ in response to said signal $Y(n)$ and said decision $\hat{A}(n)$, and updating the coefficients $W_{k_1,k_2,k_3}^{(3)*}(n)$, $W_{k_4,k_5,k_6}^{(4)*}(n)$ and $W_{k_7,k_8,k_9}^{(5)*}(n)$ in accordance with $$W_{k_1,k_2,k_3}^{(3)}(n) = W_{k_1,k_2,k_3}^{(3)}(n) - \beta_3(n)R(n-j_1)R(n-k_2)R(n-k_3)\hat{J}^*(n),$$

$$W_{k_4,k_5,k_6}^{(4)}(n+1) = W_{k_4,k_5,k_6}^{(4)}(n) - \beta_4(n)R(n-k_4)R(n-k_5)R(n-k_6)\hat{J}^*(n),$$

-continued $$W^{(5)}_{k_7,k_8,k_9}(n+1) =$$
$$W^{(5)}_{k_7,k_8,k_9}(n) - \beta_5(n)R(n-k_7)^*R(n-k_8)^*R(n-k_9)\cdot \hat{J}^*(n),$$

$\beta_3(n)$, $\beta_4(n)$ and $\beta_5(n)$ being selected scaling factors.

18. In an arrangement for equalizing samples of a received modulated data signal, said modulated data signal being of the type in which both the carrier phase and amplitude are information-bearing, and each of said samples being represented by a complex number, that improvement which comprises means (51–55, 61–65) for forming a plurality of signal products associated with an individual one of said samples, each multiplicand of each product being derived from a respective one of said samples, each said respective one of said samples bearing a predetermined temporal relationship to said individual one of said samples, and at least one multiplicand of individual ones of said signal products being the complex conjugate of the sample from which said one multiplicand is derived, means (71–75) for multiplying each of said products by an associated coefficient to form a plurality of weighted products, and means (81–86) for combining said weighted products with each other to generate a feedforward nonlinear signal.

19. In an arrangement for equalizing samples of a received quadrature amplitude modulated data signal, each of said samples being represented by a complex number, that improvement which comprises means (51–55, 61–65) for forming a plurality of signal products associated with an individual one of said samples, each multiplicand of each product being derived from a respective one of said samples, each said respective one of said samples bearing a predetermined temporal relationship to said individual one of said samples, and at least one multiplicand of individual ones of said signal products being the complex conjugate of the sample from which said one multiplicand is derived, means (71–75) for multiplying each of said products by an associated coefficient to form a plurality of weighted products, and means (81–86) for combining said weighted products with each other to generate a feedforward nonlinear signal.

20. The invention of claim 18 or claim 19 further comprising means (11, 43) responsive to predetermined ones of said samples for generating a feedforward linear signal and for combining it with said feedforward nonlinear signal to form a composite feedforward signal and means (12, 14, 17) responsive to said composite feedforward signal for recovering the modulated data from said samples.

21. In an arrangement for equalizing complex samples of a received modulated data signal in which both the carrier phase and amplitude are information-bearing, that improvement which comprises means (51–55, 61–65) operative during each of a plurality of successive sampling periods for forming a plurality of signal products associated with an individual one of said samples, each multiplicand of each product being derived from a respective one of said samples, each said respective one of said samples bearing a predetermined temporal relationship to said individual one of said samples, at at least one multiplicand of individual ones of said signal products being the complex conjugate of the sample from which said one multiplicand is derived, means (71–75) operative during each of said sampling periods for multiplying said products by respective associated coefficients to form a plurality of weighted products, the value of each of said coefficients during an individual one of said sampling being its value during a preceding sampling period modified by a correction factor, means (81–86) for combining said weighted products with each other to generate a feedforward nonlinear signal, means (11, 43) responsive to predetermined ones of said samples for generating a feedforward linear signal and for combining it with said feedforward nonlinear signal to form a composite feedforward signal, means (12) for demodulating said composite feedforward signal, means (17) for generating a quantized data signal in response to the demodulated composite feedforward signal, means for forming an error signal (20) in response to said demodulated signal and said quantized data signal, and means (28) for modulating said error signal at the carrier frequency of said modulated data signal to form a modulated error signal, said correction factor for an individual one of said coefficients being a function of the product associated with said individual one of said coefficients during said preceding sampling period and of the modulated error signal for said preceding sampling period.

22. In a method for equalizing complex samples of a received modulated data signal, said modulated data signal being of the type in which both the carrier phase and amplitude are modulated, that improvement which comprises the steps of forming a plurality of signal products associated with an individual one of said samples, each multiplicand of each product being derived from a respective one of said samples, each said respective one of said samples bearing a predetermined temporal relationship to said individual one of said samples, and at least one multiplicand of individual ones of said signal products being the complex conjugate of the sample from which said one multiplicand is derived, multiplying each of said products by an associated coefficient to form a plurality of weighted products, and combining said weighted products with each other to generate a feedforward nonlinear signal.

23. In a method for equalizing complex samples of a received quadrature amplitude modulated data signal, that improvement which comprises the steps of forming a plurality of signal products associated with an individual one of said samples, each multiplicand of each product being derived from a respective one of said samples, each said respective one of said samples bearing a predetermined temporal relationship to said individual one of said samples, and at least one multiplicand of individual ones of said signal products being the complex conjugate of the sample from which said one multiplicand is derived, multiplying each of said products by an associated coefficient to form a plurality of weighted products, and combining said weighted products with each other to generate a feedforward nonlinear signal.

24. The invention of claim 22 or claim 23 comprising the further steps of generating a feedforward linear signal in response to predetermined ones of said samples and combining said feedforward linear signal with said feedforward nonlinear signal to form a composite feedforward signal, and recovering the modulated data from said samples in response to said composite feedforward signal.

25. In a method for equalizing samples of a received modulated data signal in which both the carrier phase and amplitude are information-bearing, each of said samples being represented by a complex number, that improvement which comprises the steps of forming during each of a plurality of successive sampling periods a plurality of signal products associated with an individual one of said samples, each multiplicand of each product being derived from a respective one of said samples, each said respective one of said samples bearing a predetermined temporal relationship to said individual one of said samples, and at least one multiplicand of individual ones of said signal products being the complex conjugate of the sample from which said one multiplicand is derived, multiplying said products by respective associated coefficients during each of said sampling periods to form a plurality of weighted products, the value of each of said coefficients during an individual one of said sampling periods being its value during the preceding sampling period modified by a correction factor, combining said weighted products with each other to generate a feedforward nonlinear signal, generating a feedforward linear signal in response to predetermined ones of said samples and combining said feedforward linear signal with said feedforward nonlinear signal to form a composite feedforward signal, demodulating said composite feedforward signal, generating a quantized data signal in response to the demodulated composite feedforward signal, forming an error signal in response to said demodulated signal and said quantized data signal, and, modulating said error signal at the carrier frequency of said modulated data signal to form a modulated error signal, said correction factor for an individual one of said coefficients being a function of the product associated with said individual one of said coefficients during said preceding sampling period and of the modulated error signal for said preceding sampling period.

* * * * *

UNITED STATES PATENT AND TRADEMARK OFFICE
CERTIFICATE OF CORRECTION

PATENT NO. : 4,213,095
DATED : July 15, 1980
INVENTOR(S) : David D. Falconer

It is certified that error appears in the above—identified patent and that said Letters Patent is hereby corrected as shown below:

Column 3, line 38, "(n=2)" should read --(n-2)--;

Column 7, line 6, "$\alpha$" should read --$\partial$--; lines 8-12, "$\delta$" each occurrence, should read --$\partial$--; line 31, "$k_1, k_2, k_3$" should read --$k_4, k_5, k_6$--; line 37, "$\Gamma_5$" should read --$\beta_5$--.

Signed and Sealed this

*Twenty-second* Day of *June 1982*

[SEAL]

*Attest:*

GERALD J. MOSSINGHOFF

*Attesting Officer* — *Commissioner of Patents and Trademarks*